(12) United States Patent  (10) Patent No.: US 7,904,279 B2
Miguelanez et al.  (45) Date of Patent: Mar. 8, 2011

(54) METHODS AND APPARATUS FOR DATA ANALYSIS

(75) Inventors: Emilio Miguelanez, Scotland (GB);
Michael J. Scott, Chandler, AZ (US);
Greg LaBonte, Phoenix, AZ (US)

(73) Assignee: Test Advantage, Inc., Tempe, AZ (US)

( * ) Notice: Subject to any disclaimer, the term of this patent is extended or adjusted under 35 U.S.C. 154(b) by 590 days.

(21) Appl. No.: 11/857,654

(22) Filed: Sep. 19, 2007

(65) Prior Publication Data

US 2008/0091977 A1   Apr. 17, 2008

Related U.S. Application Data

(63) Continuation-in-part of application No. PCT/US2007/062366, filed on Feb. 17, 2007, which is a continuation-in-part of application No. 11/535,851, filed on Sep. 27, 2006, which is a continuation-in-part of application No. 10/817,750, filed on Apr. 2, 2004, now Pat. No. 7,395,170.

(51) Int. Cl.
*G06F 11/00* (2006.01)
(52) U.S. Cl. ....................................... 702/189
(58) Field of Classification Search ................ 702/189
See application file for complete search history.

(56) References Cited

U.S. PATENT DOCUMENTS

| | | |
|---|---|---|
| 4,109,511 A | 8/1978 | Powers, Jr. et al. |
| 4,989,166 A | 1/1991 | Akasaka et al. |
| 5,130,936 A | 7/1992 | Sheppart et al. |
| 5,240,866 A | 8/1993 | Friedman et al. |
| 5,287,284 A | 2/1994 | Sugino et al. |
| 5,495,417 A | 2/1996 | Fuduka et al. |
| 5,539,652 A | 7/1996 | Tegethoff |
| 5,668,745 A | 9/1997 | Day |
| 5,694,325 A | 12/1997 | Fukuda et al. |
| 5,787,190 A | 7/1998 | Peng et al. |
| 5,835,891 A | 11/1998 | Stoneking |
| 5,892,949 A | 4/1999 | Noble |
| 5,956,251 A | 9/1999 | Atkinson et al. |
| 5,966,527 A | 10/1999 | Krivokapic et al. |
| 6,182,022 B1 | 1/2001 | Mayle et al. |
| 6,184,048 B1 | 2/2001 | Ramon |
| 6,279,146 B1 | 8/2001 | Evans et al. |
| 6,300,772 B1 | 10/2001 | Brown et al. |

(Continued)

FOREIGN PATENT DOCUMENTS

EP       1067392 A2    6/2000

OTHER PUBLICATIONS

Applewhite. The view from the top. IEEE Spectrum, 41(II (INT)):Nov. 18-31, 2004.

(Continued)

*Primary Examiner* — Tung S Lau
(74) *Attorney, Agent, or Firm* — The Noblitt Group, PLLC

(57) ABSTRACT

Methods and apparatus for data analysis according to various aspects of the present invention identify statistical outliers in data, such as test data for components. The outliers may be identified and categorized according to the distribution of the data. In addition, outliers may be identified according to multiple parameters, such as spatial relationships, variations in the test data, and correlations to other test data.

21 Claims, 11 Drawing Sheets

U.S. PATENT DOCUMENTS

| | | | |
|---|---|---|---|
| 6,338,148 | B1 | 1/2002 | Gillenwater et al. |
| 6,366,851 | B1 | 4/2002 | Chojnacki et al. |
| 6,442,499 | B1 | 8/2002 | Gorin |
| 6,477,685 | B1 | 11/2002 | Lovelace |
| 6,516,309 | B1 | 2/2003 | Eberhart |
| 6,787,379 | B1 | 9/2004 | Madge et al. |
| 6,807,655 | B1 | 10/2004 | Rehani et al. |
| 6,939,727 | B1 | 9/2005 | Allen, III et al. |
| 6,943,042 | B2 | 9/2005 | Madge et al. |
| 2002/0054694 | A1 | 5/2002 | Vachtsevanos et al. |
| 2003/0014205 | A1* | 1/2003 | Tabor ............... 702/84 |
| 2003/0140287 | A1 | 7/2003 | Wu et al. |
| 2003/0144810 | A1 | 7/2003 | Tabor |

OTHER PUBLICATIONS

K. E. Parsopoulos and M. N. Vrahatis. On the Computation of All Global Minimizers through Particle Swarm Optimization, IEEE Transaction on Evolutionary Computation, Jun. 2004.

T. Poggio and F. Girosi, "Networks for approximation and learning", Proc. of the IEEE, vol. 78, pp. 1481-197, 1990.

J. Salerno, "Using the particle swarm optimization technique to train a recurrent neural model", IEEE Inter. Conference on Tools with Artificial Intelligence, pp. 45-49, 1997.

Y. Shi and R.C. Eberhart, "Parameter selection in particle swarm optimization", in Proc. of the 1998 Annual Conference on Evolutionary Programming, San Diego, CA, 1998.

Y. Shi and R. C. Eberhart. "A Modified Particle Swarm Optimizer", in Proc. of Intl. Joint Conf. on Neural Networks, Washington, USA, pp. 69-73, Jul. 1999.

K. W. Tobin, S. S. Gleason, T. P. Karnowski, An Image Paradigm for Semiconductor Defect Data Reduction, SPIE's International Symposium on Microlithography, 1996.

K.W. Tobin, S.S. Gleason, F. Lakhami, and M.H. Bennet, "Automated Analysis for Rapid Defect Sourcing and Yield Learning", Future Fab International, vol. 4, 1997.

K.W. Tobin, S. S.Gleason, T.P. Karnowski, and S.L. Cohen, Feature Analysis and classification of Manufacturing Signatures on Semiconductor Wafers. SPIE 9th Annual, 1997.

K. W. Tobin, S. S. Gleason, T. P. Karnowski, S. L. Cohen and F. Lakhani, Automatic Classification of Spatial Signatures on Semiconductor Wafermaps, SPIE 22nd Annual, 1997.

Tseng, L. Y. and Yang, S. B., "Genetic Algorithms for Clustering, Feature Selection and Classification", International Conference on Neural Networks, Jun. 9-12, 1997.

Daasch, Robert, Variance Reduction Using Wafer Patterns in Iddq Data, Proceeding of International Test Conference Oct. 2000, pp. 189-198.

Daasch, Robert, Neighbor Selection for Variance Reduction in Iddq and Other Parametric Data, ITC International Test Conference, IEEE 2001.

Motorola, Process average testing (PAT) Statistical Yield Analysis (SYA) and Junction Verificatio Test (JVT), Aug. 3, 1998.

Becker, Claudia, Performance Criteria for Multivariate outlier identification procedures, 2000, University of Dortmund, Department of Statistics, Germany.

Madge et al., LSI Logic and Portland State University Introduce "Statistical Post Processing" System, VTS 2002, paper 4.1.

Jeff Chappell, LSI Applies Statistics to Defectivity, Apr. 14, 2003 (http://www.reed-electronics.com/electronicnews/index.asp?layout=articlePrint&articleID=CA292185).

Erik Jan Marinissen, et al., Creating Value Through Test, IEEE 2003, 1530-1591.

Russell B. Miller, et al., Unit Level Predicted Yield: a Method of Identifying High Defect Density Die at Wafer Sort, IEEE 2001, 1118-1127.

Guidelines for Part Average Testing, Automotive Electronics Council, AEC-Q001-Rev-C Jul. 18, 2003.

Zinke, Kevin, et al. Yield Enhancement Techniques Using Neural Network Pattern Detection, IEEE 1997, 211-215.

Lejeune, Philippe et al., Minimizing Yield Loss with Parts Average Testing (PAT) and Other DPM Reduction Techniques, Tetradyne Users Group, 2006.

Lejeune, Philippe et al., Minimizing Yield Loss with Parts Average Testing (PAT) and Other DPM Reduction Techniques (Presentation), Tetradyne Users Group, 2006.

Agilent PDQ-WLR(tm) Test and analysis software environment—product note Agilent Technologies, 2000.

Advance Parametric Tester with HP SPECS, Hewlett-Packard Company 1999.

* cited by examiner

METHODS AND APPARATUS FOR DATA ANALYSIS

CROSS-REFERENCES TO RELATED APPLICATIONS

This application:

is a continuation-in-part of PCT Patent Application Serial No. PCT/US2007/062366, filed on Feb. 17, 2007, entitled "Methods and Apparatus for Data Analysis";

is a continuation-in-part of U.S. patent application Ser. No. 11/535,851, filed on Sep. 27, 2006, entitled "Methods and Apparatus for Hybrid Outlier Detection"; and is a continuation-in-part of U.S. patent application Ser. No. 10/817,750, filed on Apr. 2, 2004, now U.S. Pat. No. 7,395,170, entitled "Methods and Apparatus for Data Analysis";

and incorporates the disclosure of each application by reference. To the extent that the present disclosure conflicts with any referenced application, however, the present disclosure is to be given priority.

BACKGROUND OF THE INVENTION

Semiconductor companies test components to ensure that the components operate properly. Test data may come from a variety of sources, such as parametric electrical testing, optical inspection, scanning electron microscopy, energy dispersive x-ray spectroscopy, and focused ion beam processes for defect analysis and fault isolation. Testing is typically performed before device packaging (at wafer level) as well as upon completion of assembly (final test).

Gathering and analyzing test data is expensive and time consuming. Automatic testers apply signals to the components and read the corresponding output signals. The output signals may be analyzed to determine whether the component is operating properly. Each tester generates a large volume of data. For example, each tester may perform 200 tests on a single component, and each of those tests may be repeated 10 times. Consequently, a test of a single component may yield 2000 results. Because each tester is testing 100 or more components an hour and several testers may be connected to the same server, the test process generates an enormous amount of data.

Furthermore, much of the data interpretation is performed manually by engineers who review the data and make deductions about the test and manufacturing process based on their experience and familiarity with the fabrication and test process. Although manual analysis is often effective, engineers understand the fabrication and test systems differently, and are thus prone to arriving at different subjective conclusions based on the same data. Another problem arises when experienced personnel leave the company or are otherwise unavailable, for their knowledge and understanding of the fabrication and test system and the interpretation of the test data cannot be easily transferred to other personnel.

BRIEF DESCRIPTION OF THE DRAWING

A more complete understanding of the present invention may be derived by referring to the detailed description and the claims when considered in connection with the following illustrative figures, which may not be to scale. Like reference numbers refer to similar elements throughout the figures.

Elements in the figures are illustrated for simplicity and clarity and have not necessarily been drawn to scale. For example, the connections and steps performed by some of the elements in the figures may be exaggerated or omitted relative to other elements to help to improve understanding of embodiments of the present invention.

DETAILED DESCRIPTION OF EXEMPLARY EMBODIMENTS

The present invention may be described in terms of functional block components and various process steps. Such functional blocks and steps may be realized by any number of hardware or software components configured to perform the specified functions. For example, the present invention may employ various testers, processors, storage systems, processes, and algorithms, such as statistical engines, memory elements, signal processing elements, neural networks, pattern analyzers, logic elements, programs, and the like, which may carry out a variety of functions under the control of one or more testers, microprocessors, or other control devices. In addition, the present invention may be practiced in conjunction with any number of test environments, and each system described is merely one exemplary application for the invention. Further, the present invention may employ any number of conventional techniques for data analysis, component interfacing, data processing, component handling, and the like.

Figure 1:
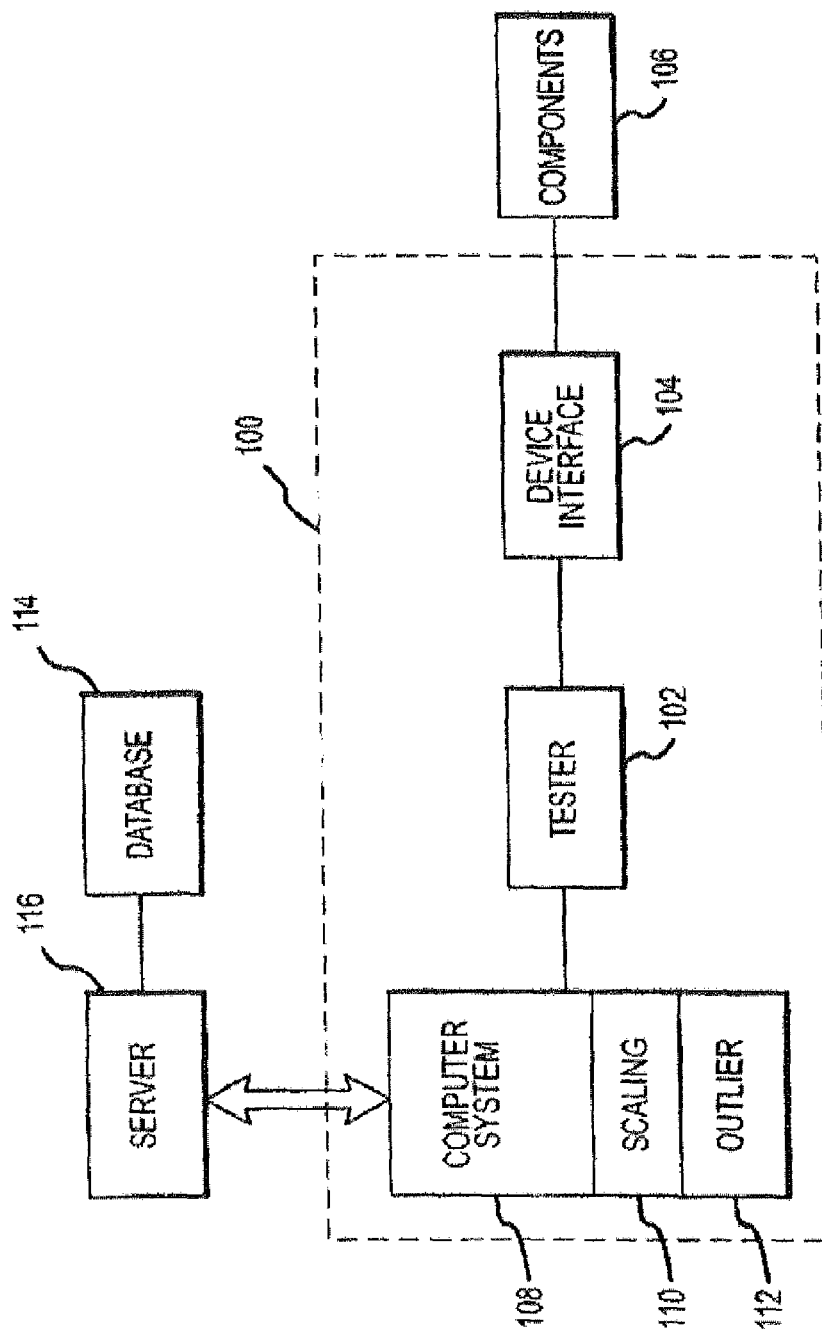
FIG. 1 is a block diagram of a test system according to various aspects of the present invention and associated functional components.

Referring to FIG. 1, a method and apparatus according to various aspects of the present invention operates in conjunction with a test system 100 having a tester 102, such as automatic test equipment (ATE) for testing semiconductors. In the present embodiment, the test system 100 comprises a tester 102 and a computer system 108. The test system 100 may be configured for testing any components 106, such as semiconductor devices on a wafer, circuit boards, packaged devices, or other electrical or optical systems. Various aspects of the present invention, however, may be applied to many environments having multiple data points, such as credit card fraud detection, athlete performance analysis, voting irregularity analysis, and severe weather prediction. In the present embodiment, the components 106 comprise multiple integrated circuit dies formed on a wafer or packaged integrated circuits or devices. The components 106 are created using a fabrication process, which may comprise any suitable manufacturing process for creating the components 106, and may include a test process, which may comprise any suitable process for testing the operation of the components 106.

The tester 102 suitably comprises any test equipment that tests components 106 and generates output data relating to the testing, and may comprise multiple machines or other sources of data. The tester 102 may comprise a conventional automatic tester, such as a Teradyne tester or the like, and suitably operates in conjunction with other equipment for facilitating the testing. The tester 102 may be selected and configured according to the particular components 106 to be tested and/or any other appropriate criteria.

The tester 102 may operate in conjunction with the computer system 108 to, for example, program the tester 102, load and/or execute the test program, collect data, provide instructions to the tester 102, analyze test data, control tester parameters, and the like. In the present embodiment, the computer system 108 receives tester data from the tester 102 and performs various data analysis functions independently of the tester 102. The computer system 108 may comprise a separate computer having a processor and a memory, such as a personal computer or workstation, connected to or networked with the tester 102 to exchange signals with the tester 102. In an alternative embodiment, the computer system 108 may be omitted from or integrated into other components of the test system 100, and various functions may be performed by other components, such as the tester 102 or elements connected to the network.

The memory suitably stores a component identifier for each component 106, such as x-y coordinates corresponding to a position of the component 106 on a wafer map for the tested wafer. Each x-y coordinate in the memory may be associated with a particular component 106 at the corresponding x-y coordinate on the wafer map. Each component identifier has one or more fields, and each field corresponds, for example, to a particular test performed on the component 106 at the corresponding x-y position on the wafer, a statistic related to the corresponding component 106, or other relevant data. The memory may be configured to include any data identified by the user as desired according to any criteria or rules.

The computer 108 of the present embodiment also suitably has access to a storage system, such as another memory (or a portion of the memory), a hard drive array, an optical storage system, or other suitable storage system. The storage system may be local, like a hard drive dedicated to the computer 108 or the tester 102, or may be remote, such as a hard drive array associated with a server to which the test system 100 is connected. The storage system may store programs and/or data used by the computer 108 or other components of the test system 100. In the present embodiment, the storage system comprises a database 114 available via a remote server 116 comprising, for example, a main production server for a manufacturing facility. The database 114 stores tester information, such as tester data files, master data files for operating the test system 100 and its components, test programs, downloadable instructions for the test system 100, and the like. In addition, the storage system may comprise complete tester data files, such as historical tester data files retained for analysis.

The test system 100 may include additional equipment to facilitate testing of the components 106. For example, the present test system 100 includes a device interface 104, like a conventional device interface board and/or a device handler or prober, to handle the components 106 and provide an interface between the components 106 and the tester 102. The test system 100 may include or be connected to other components, equipment, software, and the like to facilitate testing of the components 106 according to the particular configuration, application, environment of the test system 100, or other relevant factors. For example, in the present embodiment, the test system 100 is connected to an appropriate communication medium, such as a local area network, intranet, or global network like the internet, to transmit information to other systems, such as the remote server 116.

The test system 100 may include one or more testers 102 and one or more computers 108. Further, the computer 108 may be separate from the tester 102, or may be integrated into the tester 102, for example utilizing one or more processors, memories, clock circuits, and the like of the tester 102 itself. In addition, various functions may be performed by different computers.

A test system 100 according to various aspects of the present invention tests the components 106 and provides enhanced analysis and test results. For example, the enhanced analysis may identify incorrect, questionable, or unusual results. The test system 100 may also analyze multiple sets of data, such as data taken from multiple wafers and/or lots of wafers, to generate composite data based on multiple datasets. Further the test data may include data from multiple sources, such as process control or electrical test (ET) data relating to the electrical characteristics for various points on the wafer and/or for the components 106, bin map data one or more wafers indicating the pass/fail binning classifications for the components 106, outlier data and outlier signature data, and outlier classification data, such as categorizations of outliers as small, medium, or critical according to selected criteria. Various data may also be used by the test system 100 to diagnose characteristics in the fabrication, test, and/or other process, such as problems, inefficiencies, potential hazards, instabilities, or other aspects that may be identified via the test data. The operator, such as the product engineer, test engineer, manufacturing engineer, device engineer, or other personnel using the test data and analyses, may then use the results to verify and/or improve the test system 100 and/or the fabrication system and classify the components 106.

The test system 100 according to various aspects of the present invention executes an enhanced test process for testing the components 106 and collecting and analyzing test data. The test system 100 suitably operates in conjunction with a software application executed by the computer 108. The software application of the present embodiment includes multiple elements for implementing the enhanced test process, including a configuration element, a supplementary data analysis element, and an output element. The test system 100 may also include a composite analysis element for analyzing data from more than one dataset. Further, the test system may include a diagnostic system for identifying characteristics and potential problems using the test data.

Each software element suitably comprises a software module operating on the computer 108 to perform various tasks. Generally, the configuration element prepares test system 100 for testing and analysis. In the supplementary data analysis element, output test data from the tester 102 and/or other sources are analyzed to generate supplementary test data, suitably at run time and automatically, in conjunction with an in-line process, or after processing. The supplementary test data is then transmitted to the operator or another system, such as the composite analysis element, the diagnostic system, and/or the output element.

The test system 100 commences a test run, for example in conjunction with a conventional series of tests, in accordance with a test program. The tester 102 may perform multiple tests on each component 106 on a wafer or the wafer itself, and each test may be repeated several times on the same component 106. The tests may comprise any appropriate tests, such as (but not limited to) continuity, supply current, leakage current, parametric static, parametric dynamic, and functional and stress tests. Test data from the tester 102 is stored for quick access and supplemental analysis as the test data is acquired. The data may also be stored in a long-term memory for subsequent analysis and use.

As the tester 102 generates the test results, the output test data for each component, test, and repetition is stored by the tester 102 in a tester data file. The output test data received from each component 106 is analyzed by the tester 102 to classify the performance of the component 106, such as into a particular bin classification, for example by comparison to the upper and lower test limits, and the results of the classification are also stored in the tester data file. The tester data file may include additional information as well, such as logistics data and test program identification data. The tester data file is then provided to the computer 108 in an output file, such as a standard tester data format (STDF) file, and stored in memory. The tester data file may also be stored in the storage system for longer term storage for later analysis, such as by the composite analysis element.

When the computer 108 receives the tester data file, the supplementary data analysis element analyzes the data to provide enhanced output results. The computer 108 may provide any appropriate analysis of the tester data to achieve any suitable objective. For example, the supplementary data analysis element may implement a statistical engine for analyzing the output test data and identifying data and characteristics of the data of interest at run time or later. The data and characteristics identified may be stored, while data that is not identified may be otherwise disposed of, such as stored or discarded. The supplementary data analysis element may perform the supplementary data analysis at run time, as an in-line process, or as an off-line process. The present supplementary data analysis is performed as an in-line process, i.e., as an automatic function integrated into the testing process.

Figure 2:
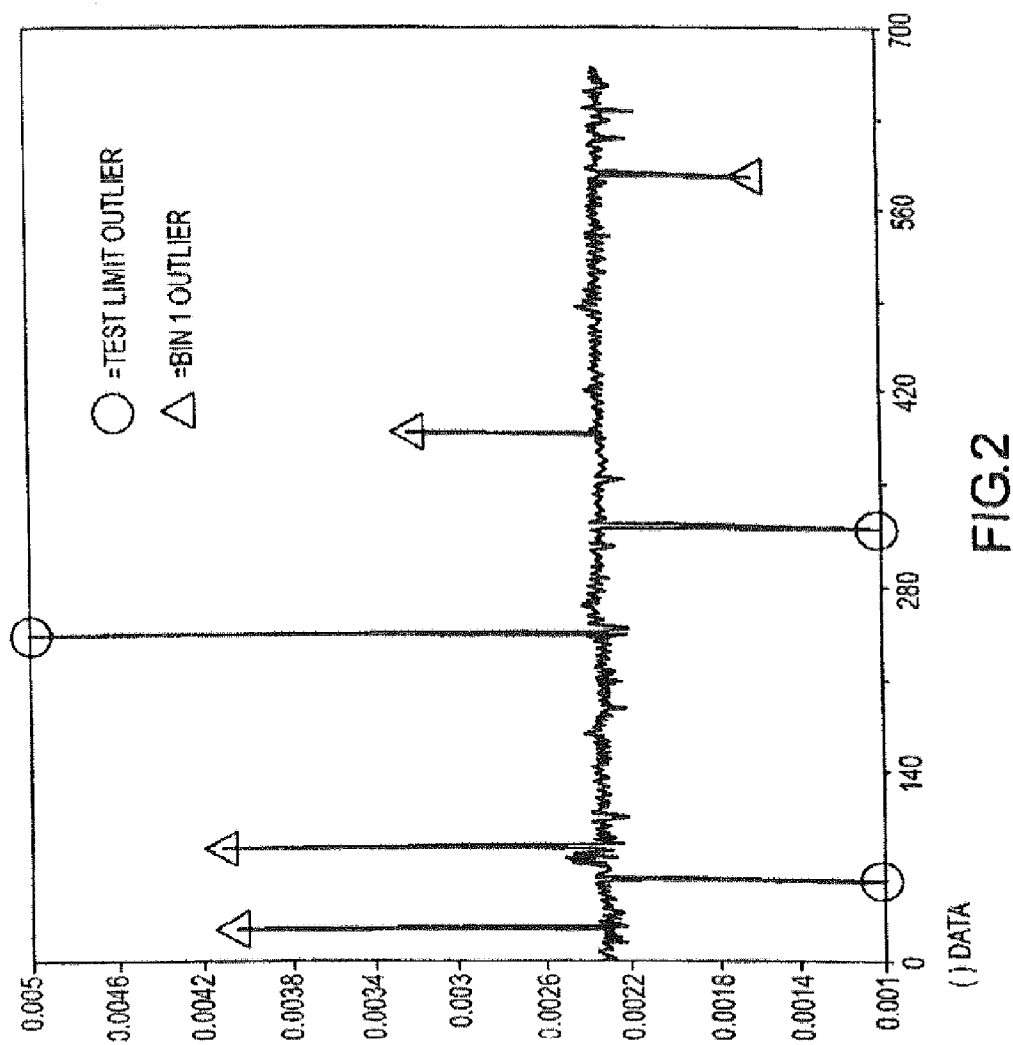
FIG. 2 is a plot of test results including outliers and failures.

The computer 108 may perform additional analysis functions upon the generated statistics and the output test data. Each test generates at least one result for at least one of the components. Referring to FIG. 2, an exemplary set of test results for a single test of multiple components comprises a first set of test results having statistically similar values and a second set of test results characterized by values that stray from the first set. Each test result may be compared to an upper test limit and a lower test limit. If a particular result for a component exceeds either limit, the component may be classified as a "bad part" or otherwise classified according to the test and/or the test result.

Some of the test results in the second set that stray from the first set may exceed the control limits, while others do not. For the present purposes, those test results that stray from the first set but do not exceed the control limits or otherwise fail to be detected are referred to as "outliers". Outliers are generally considered to be observations which appear to be inconsistent with the remainder of a set of data. The outliers in the test results may be identified and analyzed for any appropriate purpose, such as to identify potentially unreliable components. The outliers may also be used to identify various potential problems and/or improvements in the test and manufacturing processes.

Analyzing each relevant datum according to the selected algorithm suitably identifies the global and/or hybrid outliers. If a particular algorithm is inappropriate for a set of data, the computer 108 may select a different algorithm. The computer 108 may operate in any suitable manner to designate outliers, such as by comparison to pre-selected or dynamic values. For example, an outlier identification system according to various aspects of the present invention initially automatically calibrates its sensitivity to outliers based on selected statistical relationships for each relevant datum or other data. Some of these statistical relationships are then compared to a threshold or other reference point, such as the data mode, mean, or median, or combinations thereof, to define relative outlier threshold limits. In the present embodiment, the statistical relationships are scaled, for example by one, two, three, and six standard deviations of the data, to define the different outlier amplitudes. The output test data may then be compared to the outlier threshold limits to identify and categorize the output test data as outliers.

The computer 108 stores the resulting statistics and outliers, as well as corresponding identifiers, such as the x-y wafer map coordinates. Selected statistics, outliers, and/or failures may also trigger notification events, such as sending an electronic message to an operator, triggering a light tower, stopping the tester 102, or notifying a server.

In the present embodiment, the supplementary data analysis element includes a scaling element 110 and an outlier classification engine 112. The scaling element 110 is configured to dynamically scale selected coefficients and other values, for example according to the output test data. The outlier classification engine 112 is configured to identify and/or categorize the various outliers in the data according to selected algorithms.

More particularly, the scaling element of the present embodiment uses various statistical relationships for dynamically scaling outlier sensitivity. The scaling coefficients may be calculated by the scaling element and used to modify selected outlier sensitivity values. Any appropriate criteria, such as suitable statistical relationships, may be used for scaling.

The outlier classification engine 112 is suitably configured to identify and/or categorize the outliers in the components 106, output test data, and/or analysis results according to any suitable algorithms. In addition, the outlier classification engine 112 may be configured to utilize multiple candidate outlier identification algorithms and identify one or more algorithms suited for identifying outliers in the output test data Different tests generate different population distributions, such that an outlier identification algorithm that is appropriate for one test may be inappropriate for another. The outlier classification engine 112 is suitably configured to differentiate between different data populations and automatically select one or more outlier identification algorithms based on the data population type of the current data. The automatic selection may select from any appropriate set of candidate outlier identification algorithms, and may perform the selection according to any suitable criteria and analysis.

Figure 3:
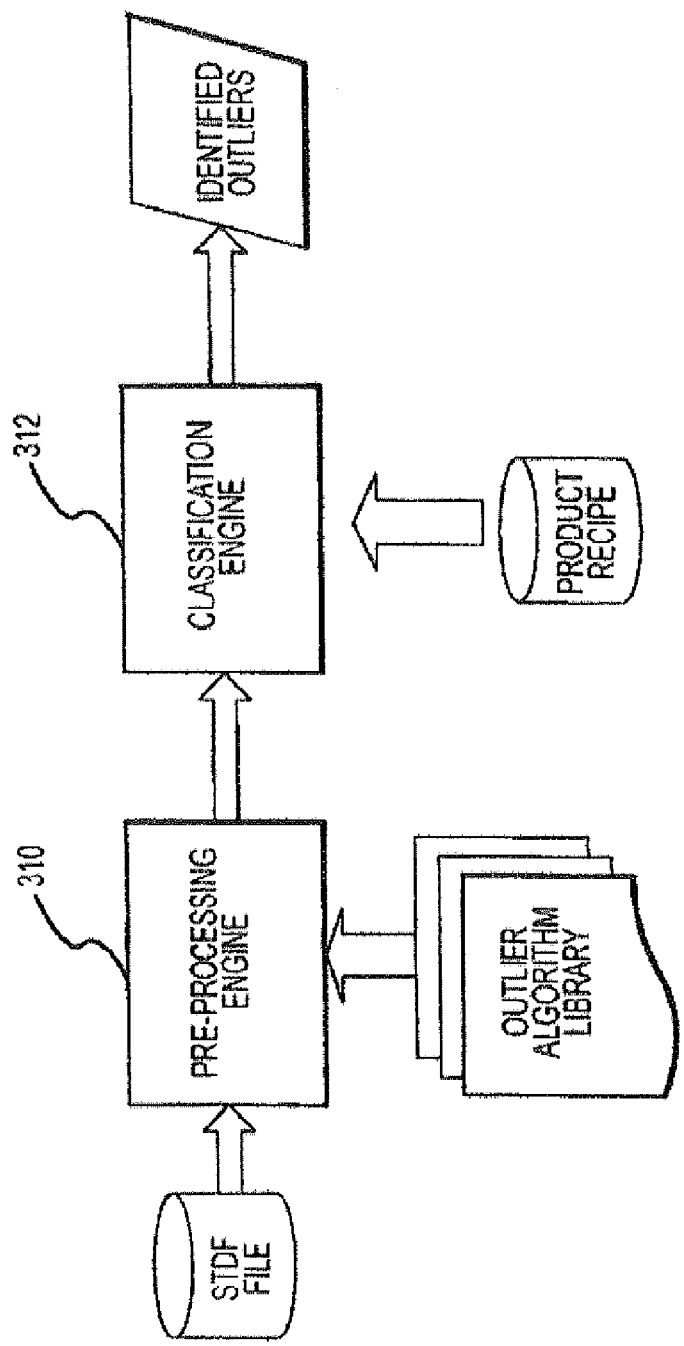
FIG. 3 is a diagram of a system for automatically selecting one or more outlier identification algorithms.

For example, referring to FIG. 3, the outlier classification engine 112 may be configured to automatically perform an outlier identification algorithm selection process. The outlier identification algorithm selection process may be performed to select one or more appropriate algorithms from multiple algorithms for identifying global and/or hybrid outliers. In one embodiment, the outlier classification engine 112 comprises a pre-processing engine 310 and a classification engine 312. The pre-processing engine 310 suitably generates data to facilitate selection of the relevant outlier identification algorithms. The classification engine 312 suitably selects one or more relevant outlier identification algorithms and identifies the global and/or hybrid outliers accordingly.

The output test data, for example data taken from a particular test, are initially provided to the outlier classification engine 112 to analyze the output test data for compatibility with various candidate outlier identification algorithms. The data may be analyzed in any suitable manner to identify appropriate algorithms for identifying the outliers in the output test data. For example, in the present embodiment, the pre-processing engine 310 receives the output test data and prepares the available outlier identification algorithms, such as by retrieving them from an outlier identification algorithm library stored in memory. The pre-processing engine 310 analyzes the output test data for outliers using several of the available algorithms. In the present embodiment, the pre-processing engine 310 analyzes the output test data using each of the algorithms designated by the user, or another suitable selection of algorithms, to generate pre-processing data, such as outliers as identified by all algorithms and various descriptive statistics, such as minimum, maximum, mean, median, standard deviation, CPK, CPM, and the like.

The algorithms may be based on industry standard (e.g., IQR, median+/−N*sigma, etc.) and/or proprietary, custom, or user-defined outlier identification techniques. The outlier identification algorithm library is suitably configurable by the user, for example to add, remove, or edit outlier identification algorithms, for example according to the particular products under test or the characteristics of the tests to be performed. Different algorithms may be appropriate for different statistical population types, such as normal, logarithmic normal, bimodal, clamped, or low CPK data populations. The candidate outlier identification algorithms may comprise any suitable algorithms for various types and distributions of data, such as inter-quartile range (IQR) normal distribution, 3 sigma; IQR normal distribution, 6 sigma; IQR log normal, 3 sigma; IQR log normal, 6 sigma; bimodal algorithms; clamped algorithms; low capability algorithms; custom algorithms based on 3-, 6-, or n-sigma; and proprietary algorithms having various sensitivities.

The pre-processing algorithm results are dynamically selected for global and/or hybrid outlier detection. In the present embodiment, the outlier classification engine 112 analyzes the test results generated by the pre-processing engine 310 to identify the most useful or applicable outlier identification algorithms. The data from the selected outlier identification algorithms may be retained, while the remaining data is discarded. For example, in the present embodiment, the classification engine 312 receives the results of the pre-processing analysis generated by each of the available outlier identification algorithms. The classification engine 312 analyzes the pre-processing data according to any suitable criteria, such as predetermined and/or user-defined recipe-driven rules to determine whether the pre-processing data satisfy various criteria.

The rules may be any appropriate rules, for example employing statistical ratios or values, such as comparing statistics, like minimum, maximum, mean, median, standard deviation, CPK, and CPM, to various thresholds or other criteria. For example, the classification engine 312 may skip the outlier detection process under certain circumstances, such as having too few test results or a too narrow or a bimodal distribution among the test results. The rules may be pre-selected and/or may be adjusted or added by the user to accommodate specific conditions of the products and test environment. Further, the classification engine 312 may be configured to apply a particular algorithm to a certain type of test, for example when the results of the test are known to have a particular distribution. Other rules may determine whether a particular test is applicable. For example, the classification engine 312 may compare the CPK to a threshold. If the CPK is below the threshold, then the IQR normal outlier identification algorithm may be used. In the present system, results from an algorithm satisfying a rule are used for outlier identification. Other algorithm results for that test are suitably ignored.

The outlier classification engine 112 may also categorize selected global and/or hybrid outliers and components 106 according to the test results and the information generated by the supplementary analysis element. For example, the outlier classification engine 112 may be configured to categorize the components 106 into critical/marginal/good part categories, for example in conjunction with user-defined criteria; user-defined good/bad spatial patterns recognition; classification of pertinent data for tester data compression; test setup in-situ sensitivity qualifications and analysis; tester yield leveling analysis; dynamic wafer map and/or test strip mapping for part dispositions and dynamic retest; or test program optimization analyses. The outlier classification engine 112 may classify components 106 and associated data in accordance with conventional SPC control rules, such as Western Electric rules or Nelson rules, to characterize the data.

The outlier classification engine 112 suitably categorizes the data using a selected set of classification limit calculation methods. Any appropriate categorization methods may be used to characterize the data according to the needs of the operator. The present outlier classification engine 112, for example, categorizes outliers by comparing the output test data to selected thresholds, such as values corresponding to one, two, three, and six statistically scaled standard deviations from a threshold, such as the a test limit or a data mean, mode, and/or median. The identification of outliers in this manner tends to normalize any identified outliers for any test regardless of datum amplitude and relative noise.

Figure 10:
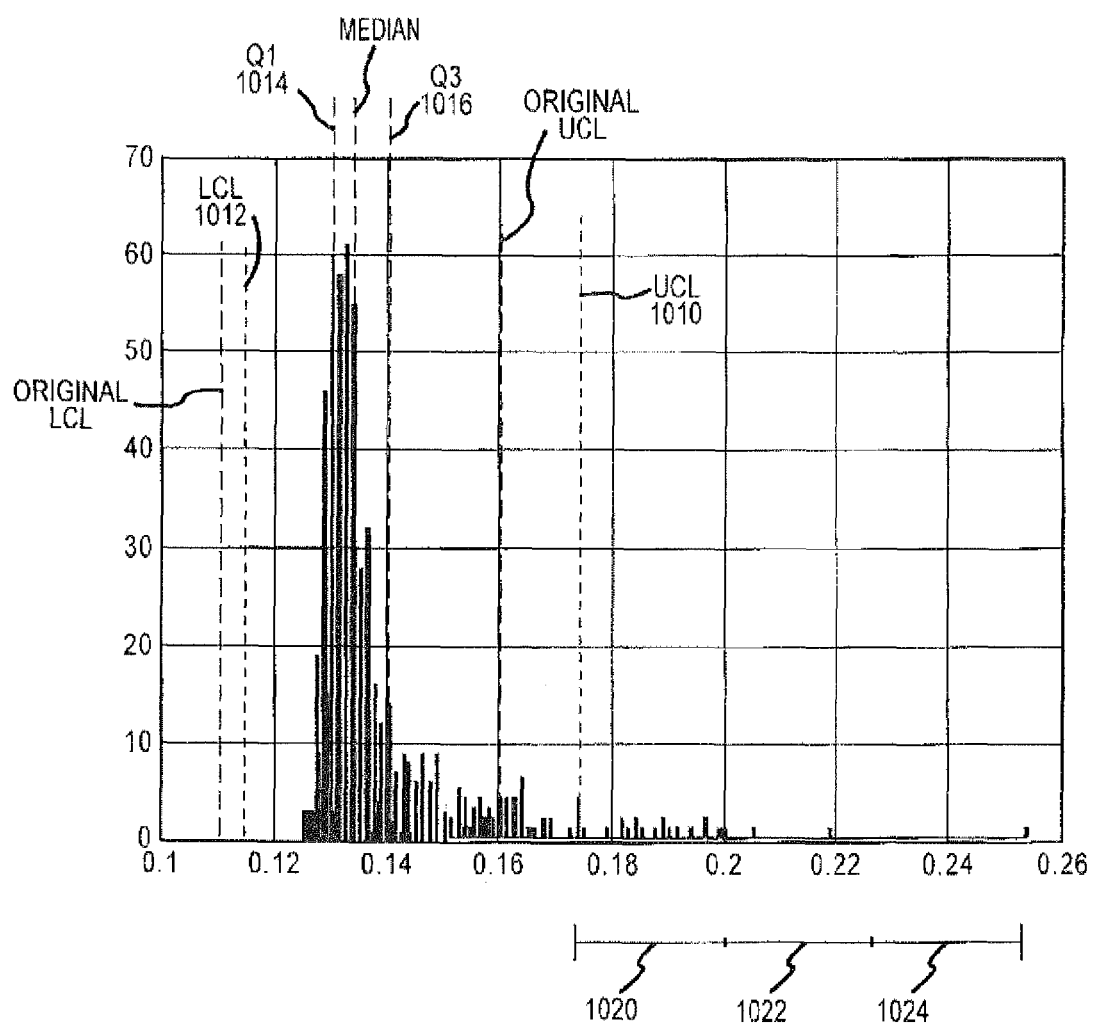
FIG. 10 is a representation of an asymmetrical distribution.

In one embodiment, the outlier thresholds may be defined asymmetrically with respect to a selected center point in the data distribution. Using asymmetrical thresholds may reduce the effects of non-Gaussian distributions and/or the presence of outliers on identifying the outliers. The outlier thresholds may be selected without determining a particular location in the data, such as a mean, or a scale, such as a standard deviation, based on the data, which can be influenced by outliers. For example, the outlier thresholds may be selected according to the distribution of the data, such as by deriving the thresholds from a center point of the frequency distribution of the test data. In one embodiment, referring to FIG. 10, instead of basing the outlier thresholds on standard deviations from the center point, the outlier thresholds 1010, 1012 may be adjusted or selected according to the quartile values 1014, 1016 for the set of data. The quartile values correspond to the median values between the median of the full data set and the edge of the distribution.

In addition, the thresholds 1010, 1012 may be adjusted according to any relevant criteria, such as the distribution of the data. In one embodiment, the thresholds 1010, 1012 are adjusted according to the generalized slope of the data distribution in the relevant area, such as around the first and third quartile points 1014, 1016. For example, the thresholds 1010, 1012 may be adjusted by an amount that is inversely related to the general slope of the data in the relevant area. Consequently, in an area where the slope is lower, the outlier thresholds 1010, 1012 may be farther from the center point than in an area where the slope is higher. Thus, the lower threshold and upper threshold 1010, 1012 may be selected according to the equations:

$$UCL = Q3 + N*UQW$$

$$LCL = Q1 - N*LQW$$

where UCL and LCL are the upper and lower outlier thresholds 1010, 1012 respectively, Q1 and Q3 are respectively the first and third quartile marks, N is a constant, and UQW and LQW are weights assigned according to an inverse relationship to the slope.

Additional thresholds may be defined as well, for example to define small, medium, and large outliers. The thresholds and categories may be defined in any manner. For example, the category thresholds may be determined according to scaled statistical relationships, for example by one, two, three, and six standard deviations of the data from the median, to define the different outlier amplitudes. The output test data may then be compared to the outlier threshold limits to identify and categorize the output test data as outliers.

Alternatively, the categories may be defined relative to the outlier thresholds. The demarcations between the various categories may be selected according to any suitable criteria, such as according to the outlier threshold, the test limit, and/or the edge of the distribution. For example, the range between the outlier threshold and the test limit may be divided into two or more categories 1020, 1022, 1024. The range between the outlier threshold and the test limit may be divided into equal areas or different areas to define different magnitudes of outliers. In the present embodiment, each side of the distribution between the outlier threshold and the edge of the distribution is divided into three or four equal categories 1020, 1022, 1024 to define the outliers as large, medium, small, and/or tiny. The size and number of the various categories may be identical on both sides of the distribution, or may vary for each side of the distribution.

The outlier classification engine 112 analyzes and correlates the normalized outliers and/or the raw data points based on user-defined rules. The outlier classification engine 112 suitably performs the categorization according to each test, which may be performed independently of data from other tests or in conjunction with such data from other tests. Any suitable criteria may be used for categorizing the components based on test failures and outliers, such as:

FAIL if the part fails at least one test.

CRITICAL if at least one test has been identified to have a LARGE outlier or at least two MEDIUM outliers on two different tests for the otherwise passing part.

MARGINAL if at least one test has been identified to have a MEDIUM outlier or at least four SMALL outliers on four different tests for the otherwise passing part.

SMALL if at least one test has been identified to have a SMALL outlier for the otherwise passing part.

PASS without any SMALL, MEDIUM, or LARGE outlier for the otherwise passing part.

Criteria for small, medium, and large outliers may be selected according to any suitable criteria, such as thresholds based on the test limits and/or characteristics of the data.

Figure 4:
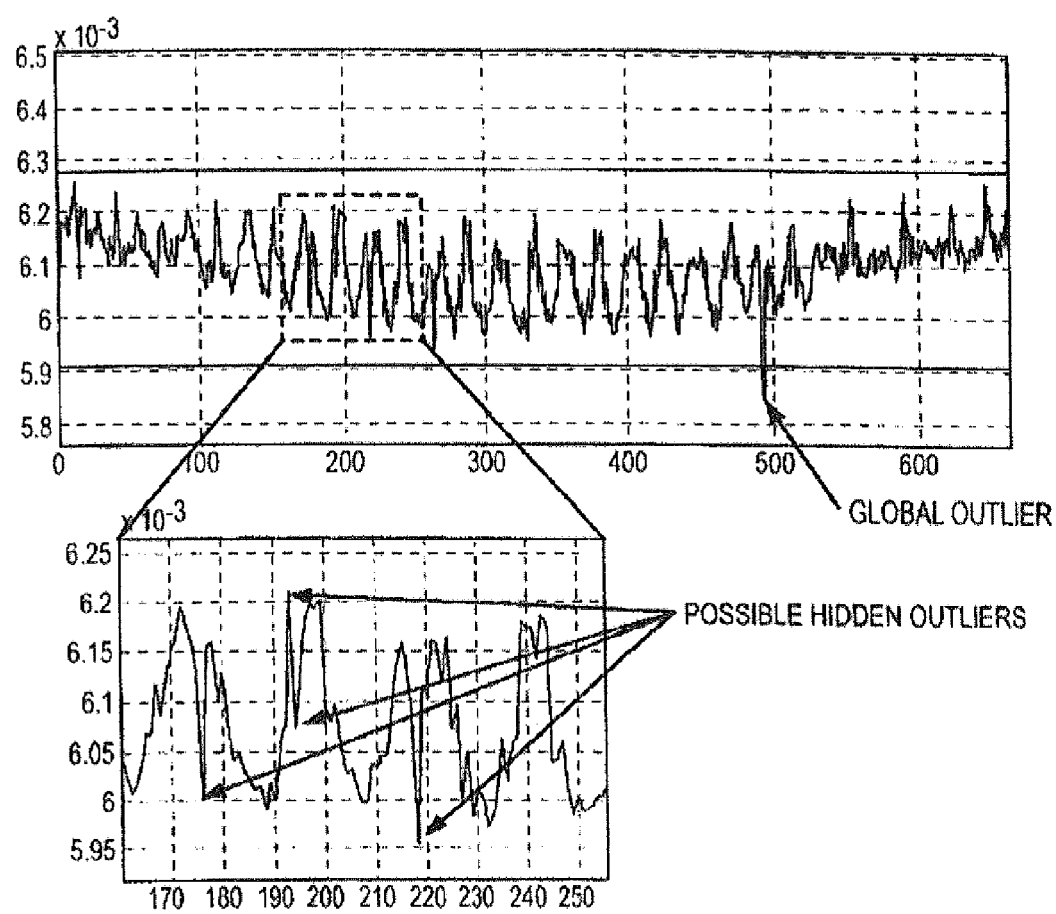
FIG. 4 is a plot of test results including hidden outliers.

The outlier classification engine 112 may also include a hybrid outlier system configured to identify hybrid outliers, also referred to as local outliers or hidden outliers, in the data. Hybrid outliers are inconsistent data points within a local group of data, but do not cross the thresholds defining the "global" outlier boundaries of the main population. Referring to FIG. 4, a global outlier lies outside the data distribution of the main data population. Hybrid outliers, however, do not lie outside the data distribution of the main data population, but may deviate significantly from the norm in view of multiple parameters. Thus, the outlier classification system may analyze the test data to identify outliers according to two or more parameters. Other parameters may be any appropriate data, such as data for spatially related components, data resulting from correlated tests, or other relevant data. For example, spatial information may be used to identify devices whose parameters are all within the main distribution, but not consistent with data for a more local physical area. Additionally, a high level of correlation between two parameters may be used to identify devices whose parameters are individually consistent with the main distribution, but are not consistent in their relationship to another parameter.

The degree of correlation between two parameters, such as results of two tests, may be assessed in any manner. For example, a correlation index may be calculated using linear or logarithmic regression techniques, such as to establish a best-fit straight line between two data sets. The closer the magnitude of the slope of this line is to unity, the higher the degree of correlation. Determining the degree of correlation include any relevant considerations or processes, such as removing large outliers or compensating for multi-site variation.

Figure 11A:
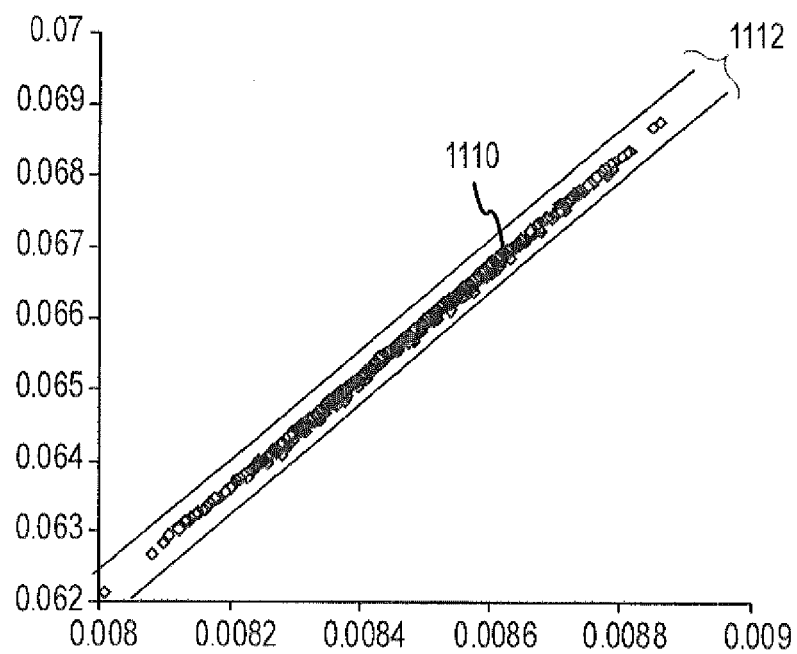
FIGS. 11A-B are correlation charts of test data for two different tests.
Figure 11B:
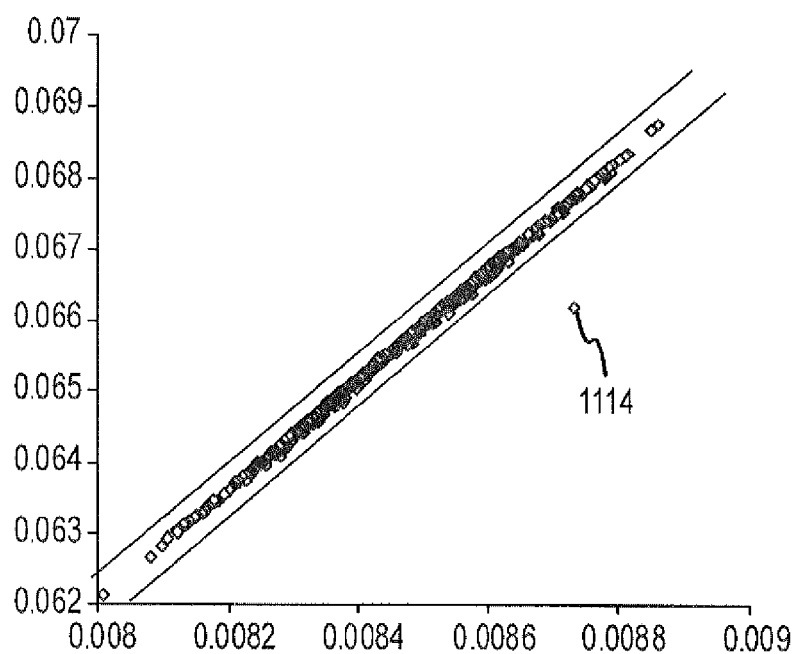

Upon determining an expected degree of correlation, the correlation of test results may be determined to identify outliers that do not conform to the underlying relationship. Referring to FIG. 11A, for tests with a high degree of correlation, all results are expected to reside within a certain distance 1112 from the best-fit straight line 1110. Referring to FIG. 11B, if an outlying result 1114 is present, then the overall correlation index slightly affected, but the corresponding data points resides outside the expected distance 1112 from the best-fit straight line 1110, even if the test result remains within the main distribution for the relevant parameter. The computer 108 may also select situations for performing correlation analyses, for example according to the degree of correlation between two parameters, availability of computing resources, and demand for optimal analysis.

Figure 5:
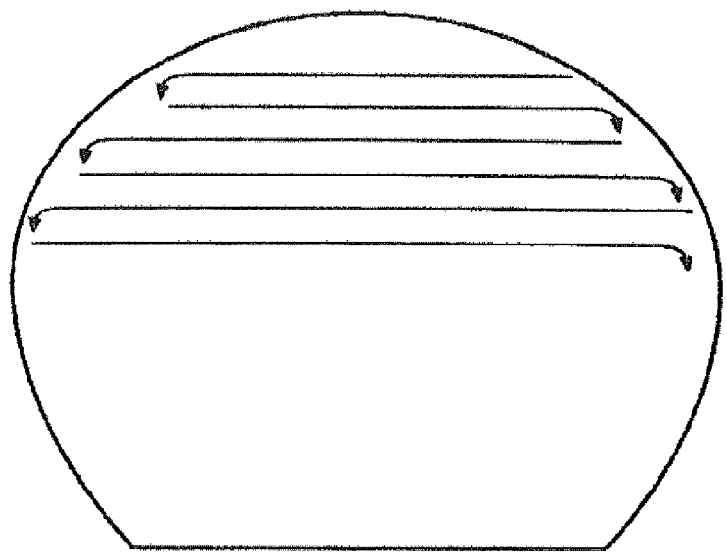
FIG. 5 is a diagram of a wafer and a sample path followed by a test prober over the wafer.
Figure 6:
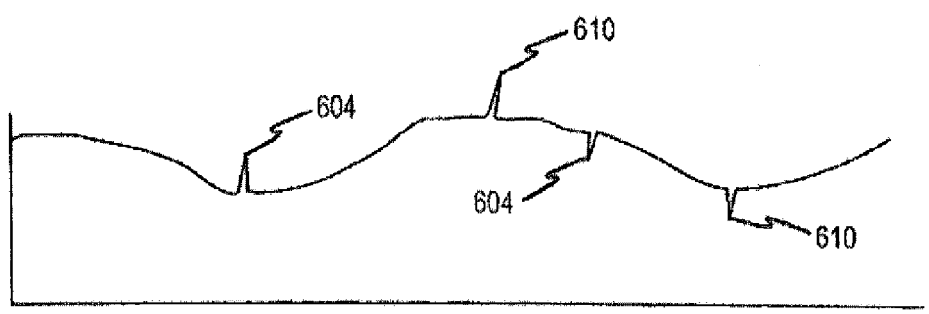
FIG. 6 is a diagram of variations of test data as the prober follows the path.

In one embodiment, hybrid outliers may be identified in view of the test data for the component relative to data for spatially related components, such as components from a smaller local population of data points, like a temporally or spatially local population. For example, referring to FIG. 5, the tester generates data by testing various components on the wafer sequentially. The tester moves the prober from component to component, accumulating test data for each component. Due to variations in the manufacturing process and materials and the testing process, the test data may vary regularly as the prober traverses the wafer (FIG. 6). Data points 610 lying well outside the variations for the wafer or for multiple wafers are ordinarily classified as global outliers. Data points 604 within or slightly beyond the variations ordinarily escape classification as global outliers, even if the data points 604 significantly differ from the data points for spatially nearby or corresponding components.

Hybrid outliers are suitably identified by analyzing individual raw, normalized, or otherwise processed data points with respect to proximate data points. The outlier classification engine 112 may apply a proximity analysis by comparing parametric or other data for individual components to hybrid outlier thresholds calculated using data for spatially related components. The proximity analysis may also be weighted, for example according to the distance between a central component and a nearby component. Proximity analysis may be performed by any appropriate system, such as a dedicated proximity analysis engine or a proximity analysis engine associated with another task, like a proximity analysis engine used for generating composite representations based on multiple datasets.

In one embodiment, as parametric data is processed, the outlier classification engine 112 may calculate hybrid outlier thresholds for a local data set, such as a selected number of most recently generated data. The data to be analyzed may comprise any suitable data, such as preceding data points, subsequent data points, both preceding and subsequent data points, temporally related data points, or spatially related data points. In addition, the number of data points in the local data set may be selected according to any suitable criteria, such as using a pre-selected number of data points or selecting the number of data points according to various criteria, such as the variability or noisiness of the data. If the data is noisy, the number of data points may be automatically adjusted, for example by increasing the number of data points in the local data set to reduce the effects of the noise. The hybrid outlier thresholds may be dynamically re-calculated with accumulation of new parametric data, for example by using a first-in, first-out (FIFO) calculation. The parametric data for the components in the area may then be compared to the thresholds to identify hybrid outliers.

The outlier classification engine 112 may be configured to identify the hybrid outliers 604 according to any suitable mechanism or process. In the present embodiment, the hybrid outliers 604 are identified in conjunction with an in-line process, i.e., performed automatically via a process that receives the data as it is generated or after testing is complete and the data stored and automatically provides the results without operator intervention or other action. Alternatively, the hybrid outliers 604 may be identified at run time or after the analysis is completed and the data stored. The outlier classification engine 112 may be integrated into the test program executed by the tester 102. The test data may comprise any type of test data, such as bin results or parametric testing data. Further, the data may be pre-processed, such as by removing global outliers and/or data for components classified as failures, or normalizing data across various sections of the wafer, such as sections associated with multisite testing or stepper fields.

Figure 7:
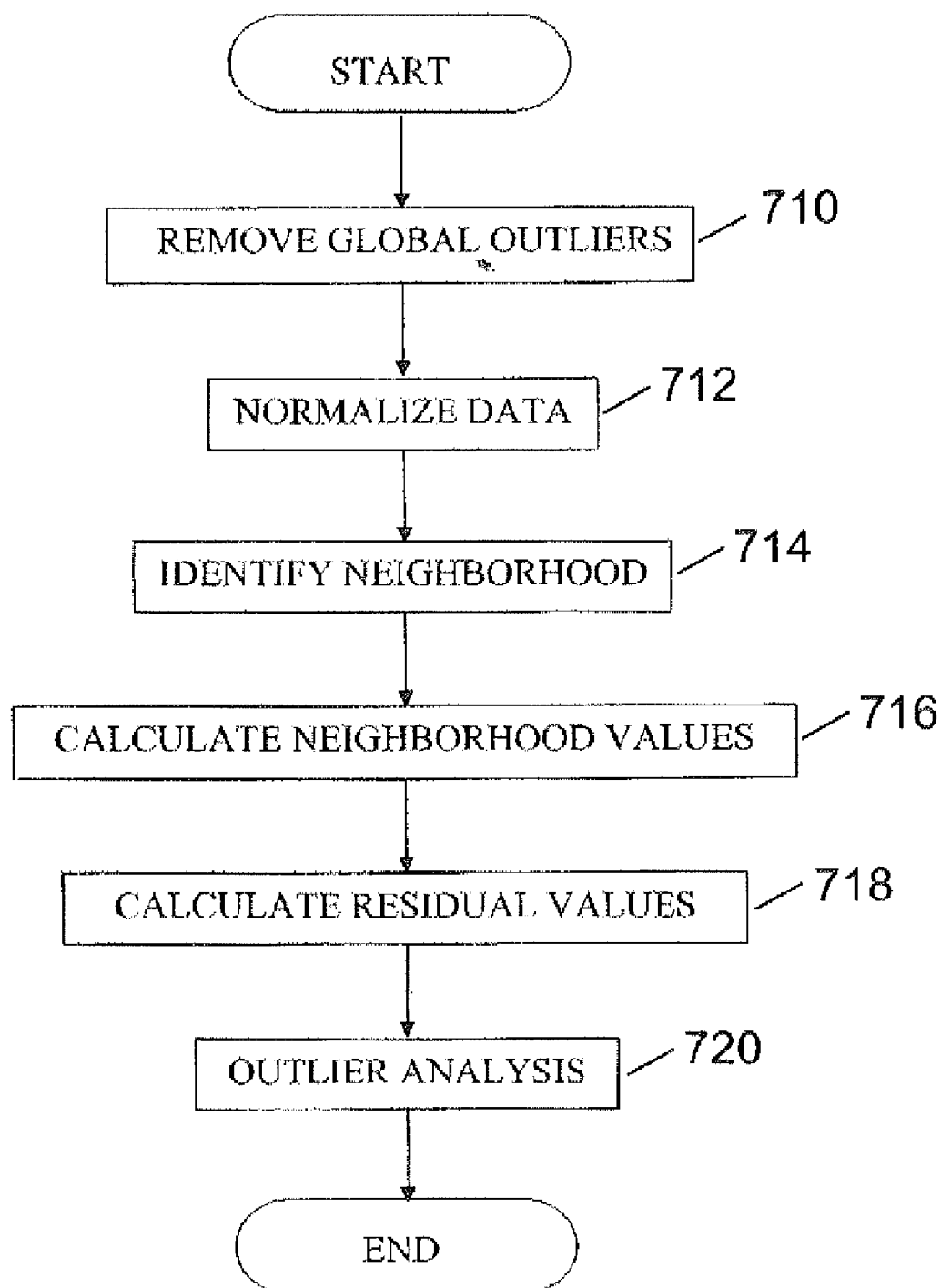
FIG. 7 is a flow diagram for identifying hybrid outliers.

Referring to FIG. 7, in the present embodiment, the outlier classification engine 112 or other outlier identification system initially filters out global outliers from the data and processes the remaining data to identify hybrid outliers (710). The outlier classification engine 112 may further process the filtered data, for example to normalize the data in view of known sources of variation (712). The outlier classification engine 112 may then identify hybrid outliers according to any suitable technique or criteria. For example, the outlier classification engine 112 may select and/or adjust a window encompassing a selected number and geometry of components to identify spatially related components (714). The outlier classification engine 112 may then determine a neighborhood value for the component corresponding to the test data for the components in the neighborhood (716). The test data for the component may then be analyzed relative to the neighborhood value to identify hybrid outliers.

In addition, the data may be normalized, which comprises adjusting data values to correct for differences in data that may be generated due to known causes that negatively impact the consistency of the data. In the present embodiment, the hybrid outlier system normalizes the test data for each component relative to test data for all other components on the wafer to facilitate comparison. For example, if the test data was generated using multi-site testing in which multiple resources test wafers or components The data may be normalized in any suitable manner, such as to address known sources of variation. Components sharing a known common source of inconsistency may be normalized using the same normalization criteria. For example, in the present embodiment, parametric test data generated in conjunction with a multi-site testing environment may be normalized according to the following equation:

$$\text{norm\_site}_n = \frac{\text{data\_site}_n - \text{median\_site}_n}{\text{iqr\_site}_n}$$

where for the site n, $\text{norm\_site}_n$ is the resulting normalized data, $\text{data\_site}_n$ is the pre-normalized data, $\text{median\_site}_n$ is the statistic median and $\text{iqr\_site}_n$ is the interquartile range for the site analyzed. The normalized data may be stored in any suitable manner, for example on a normalized data device map having the normalized data for each device.

To detect hybrid outliers, the outlier classification engine 112 analyzes local data, such as data for spatially near components. For example, the outlier classification engine 112 may detect hybrid outliers according to the geometry of the wafer. The hybrid outliers may be identified according to any suitable technique or process. In the present embodiment, the outlier classification engine 112 analyzes the data for nearby components.

Figure 8:
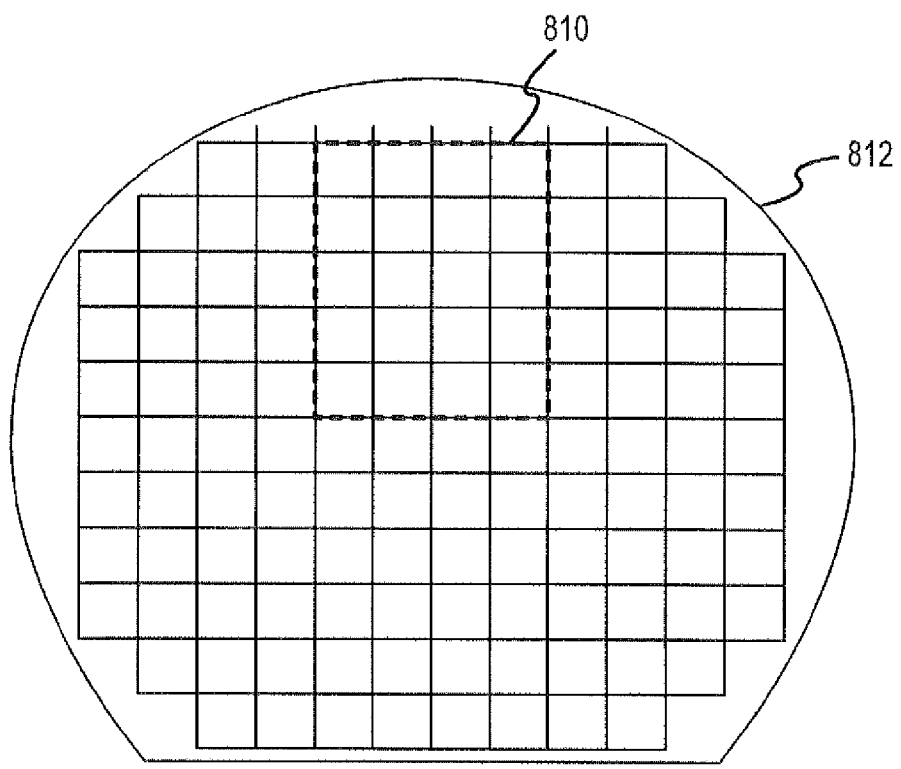
FIG. 8 is a diagram of a wafer and a spatial analysis window.

In one embodiment, the computer 108 may perform a proximity analysis for each component on the wafer. For example, the computer 108 may be configured to identify hybrid outliers by identifying outliers within subsets of the overall dataset, such as within data for a selected group of components on a particular wafer. In one embodiment, referring to FIG. 8, the computer 108 may establish a pattern or window 810 of a selected size that may be used to select multiple components on a wafer 812. The pattern or window 810 comprises a perimeter defining a spatial area of interest, such as a subset of the components on the wafer 812. The size of the window 810 may be selected or adjusted according to any suitable criteria, such as the number of components proximate the central component, the type of test or component, or the desired sensitivity of the outlier analysis. The shape of the window may likewise be selected according to any appropriate criteria, such as the spatial area of interest. For example, if the area of interest does not facilitate the use of a rectangular window, such as near the curved edges of the wafer 812, an alternative shape may be selected for the window 810 to accommodate the relevant area of the wafer 812.

Figure 9:
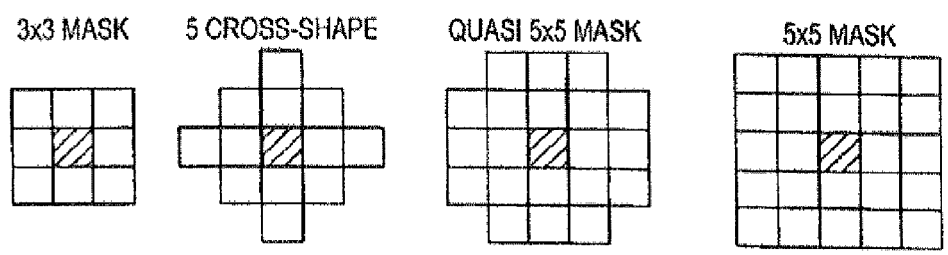
FIG. 9 is a diagram of potential filter types for proximity analysis.

Referring to FIG. 9, in one embodiment, the outlier classification engine 112 may employ one or more predetermined windows or masks that may be applied to each component in the data set to establish the relevant window. The size and shape of the windows may be selected according to any suitable criteria, such as according to a pre-selected type, an operator designation, or an automatic selection process. The user can pre-define the type and size of the window to be used or the outlier classification engine 112 can automatically adapt the window shape and/or size according to the nature of the area surrounding the relevant component, such as for locations near the edge of the wafer, possible sampling factors, empty spaces on the wafer or missing data, and the like.

In the present embodiment, the outlier classification engine 112 requires a selected amount of data, such as data for at least four to eight surrounding components, such as five, to perform the analysis. In one embodiment, the devices only count towards the minimum if they satisfy one or more selected criteria, such as being classified as passing or "good" devices. If the initial area within the window has fewer than five other "good" devices, the outlier classification engine 112 may adjust increase the size and/or shape of the window or pattern until the number of components meets the required number. In one embodiment, the outlier classification engine 112 adjusts the window or pattern by applying a predetermined sequence of patterns, in which the sequence comprises patterns of increasing size. In addition, the outlier classification engine 112 may abort the analysis if a minimum number of acceptable data is not available. For example, the outlier classification engine 112 may only perform the analysis and/or adjust the size and/or shape of the window if the device under study has at least five "bin 1" devices in the initial window. Thus, data for a particular device may be categorized as a hybrid outlier only if there are sufficient data for neighboring components in the initial window. In other embodiments, substitute data may be used. For example, the missing data may be replaced with idealized data representing ideal values for such components, or with data based on other components on the wafer, such as components in surrounding bands around the missing data or components in corresponding positions on other wafers in the lot.

The window 810 is then applied to various areas of the wafer 812, and hybrid outliers are identified among the data for components within the window 810. The outlier classification engine 112 may identify the hybrid outliers according to any appropriate criteria and technique. For example, the outlier classification engine 112 may initially analyze a starting component, such as a component at the left end of the top row of the wafer, and sequentially analyze data for each component on the wafer. The outlier classification engine 112 may adjust the size and shape of the window as each component is analyzed. Data for the components within the window are then retrieved from memory and analyzed for outliers, for example using only the data for components within the window.

The area within the window may be characterized and/or analyzed according to any suitable criteria or technique. For example, the outlier classification engine 112 may calculate one or more representative neighborhood values for each component based on the data for the surrounding components. A window is applied to each component to generate a neighborhood value for each component for the relevant test. The data for each component may then be analyzed and/or compared to the corresponding neighborhood value to identify hybrid outliers.

In the present embodiment, as the window is applied to each component, the outlier classification engine 112 calculates a neighborhood value for the window corresponding to a derived value derived from values for the components in the neighborhood. For example, the derived value may comprise an average value representing a central value for multiple values, such as an arithmetic mean, statistic median, mode, geometric mean, weighted mean, and the like. The present outlier classification engine 112 employs the median value as the neighborhood value, as the median may often operate as a robust estimator of the center of the local neighborhood. The median value is then stored, for example on a neighborhood value device map storing the neighborhood value calculated for each device. The outlier classification engine 112 moves the window to the next component. In addition, the outlier classification engine 112 may apply different weights to the data of surrounding components, such as according to the proximity of a device to the central device. For example, data for components closer to the central component may have greater affect in calculating the neighborhood value than data for components that are farther away.

Hybrid outliers may be identified by analyzing the data for each component in view of the corresponding neighborhood values. Any suitable outlier detection system or approach may be used to identify the hybrid outliers. For example, the outlier classification engine 112 may calculate a unique hybrid outlier threshold based on the neighborhood value for each component and compare the raw data to the calculated threshold. Alternatively, the outlier classification engine 112 may generate a value based on the raw data and the neighborhood value for each component and compare the value to a threshold or the like. Locations of identified hybrid outliers are stored, along with any other relevant information.

In the present embodiment, referring again to FIG. 7, the outlier classification engine 112 generates a residual value for each component according to the raw data and the unique neighborhood values (718) and applies conventional outlier identification techniques to the residuals to identify hybrid outliers (720). The residual component may be determined according to any suitable criteria or technique. In the present embodiment, residuals are calculated using the following equation:

$$\text{residual} = \frac{data_{norm} - data_{smooth}}{RMSE}$$

where $data_{norm}$ is the normalized raw test data value, $data_{smooth}$ is the relevant neighborhood value, and RMSE defines the square root of the mean square error of values for all relevant points, such as for all devices on the wafer. In the present embodiment, RMSE is the root mean square of the sum of the differences between the normalized and smoothed data for each device on the wafer. This equation produces a standardized error, which is approximately a normal distribution with mean 0 and variance of 1.

The resulting residual data may be stored, for example in a residual data device map storing residual data values for each device. Outlier detection techniques may be applied to the residual values for the various components to identify outliers. For example, the outlier classification engine 112 may calculate control limits based on the residual values, and the residual values exceeding the limits may be identified as hybrid outliers. For example, the outlier classification engine 112 may analyze the residual data according to one or more outlier identification algorithms to identify outliers in the residual data. The corresponding devices may then be designated as outliers for the relevant test.

The outlier classification engine 112 may also be configured to perform additional analysis of the hybrid outlier data. For example, the outlier classification engine 112 may identify and categorize selected hybrid outliers and components 106, such as to categorize the components 106 into multiple categories as described previously regarding global outliers. In one embodiment, the hybrid outliers are categorized as small, medium, or large hybrid outliers, for example in conjunction with user-defined criteria; user-defined spatial patterns recognition; categorization of pertinent data for tester data compression; test setup in-situ sensitivity qualifications and analysis; tester yield leveling analysis; dynamic wafer map and/or test strip mapping for part dispositions and dynamic retest; or test program optimization analyses.

The outlier classification engine 112 suitably classifies the hybrid outlier data using a selected set of classification limit calculation methods. Any appropriate classification methods may be used to characterize the hybrid outlier data according to the needs of the operator. The present outlier classification engine 112, for example, categorizes hybrid outliers by comparing the relevant test data or derived data to selected thresholds, such as values corresponding to one, two, three, and six statistically scaled standard deviations from a threshold, such as the test limits or a data mean, mode, and/or median for a relevant geographic area. The categorization of hybrid outliers in this manner tends to normalize any identified hybrid outliers for any test regardless of datum amplitude and relative noise. In one embodiment, the outlier classification engine 112 may categorize hybrid outliers according to the magnitude of the difference between the test data for the central component and the derived value for the plurality of local components. The categorization may be based directly on the difference or indirectly, such as according to a value based on or derived from the difference.

The outlier classification engine 112 analyzes and correlates the normalized hybrid outliers and/or the raw data points based on user-defined rules. The hybrid outlier classification engine 112 suitably performs the categorization according to each test, which may be performed independently of data from other tests or in conjunction with such data from other tests. Criteria for small, medium, and large outliers may be selected according to any suitable criteria, such as thresholds based on the test limits and/or characteristics of the data.

In one embodiment, the outlier classification engine 112 may forego the hybrid outlier detection analysis or discard the results of such analysis if the results appear to be unlikely to yield useful information. For example, the outlier classification engine 112 may compare the number of test data points for a particular test to a threshold, such as 20. If there are fewer than the threshold number of test data points for analysis, the outlier classification engine 112 may forego the hybrid outlier analysis. Similarly, if the number of hybrid outliers detected exceeds a threshold, such as 10, the hybrid outlier analysis results may be discarded as generating too many results to be considered hybrid outliers. Alternatively, the outlier classification engine 112 may perform and/or retain the results, but annotate the results to indicate the potentially suspect nature of the data.

The outlier classification engine 112 may also identify components that are near clusters of failures and outliers. Such components in the same area might exhibit problems similar to the outliers and failures in the area, but the problems may not be identified upon initial analysis of the test data. Thus, the outlier classification engine 112 may identify a "good die in a bad neighborhood" using failure data, global (or single-parameter) outlier data, and/or hybrid (or multiple-parameter) outlier data.

Figure 12:
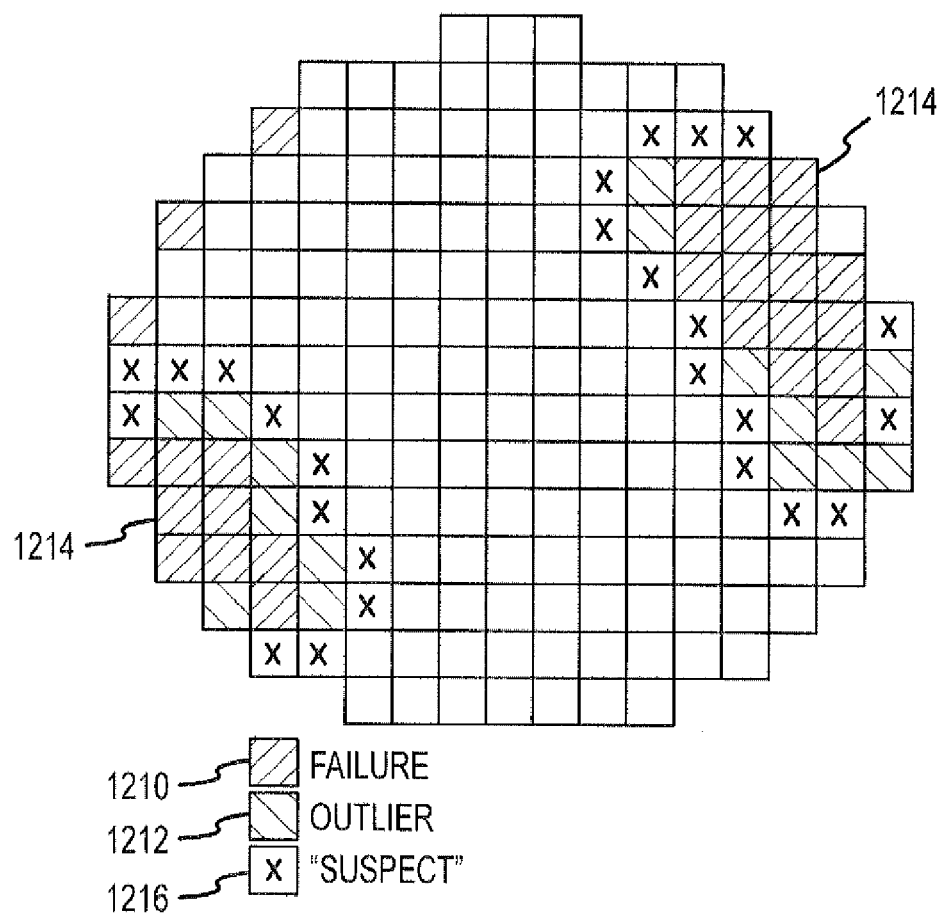
FIG. 12 is a map of test results for a wafer.

The outlier classification engine 112 may identify relevant neighborhoods and nearby components in any appropriate manner. For example, referring to FIG. 12, the outlier classification engine 112 may initially identify the relevant neighborhoods by analyzing the failure data 1210, global outlier data 1212, and/or hybrid outlier data 1212 to identify groups 1214 of adjacent or otherwise spatially related components. The neighborhoods around the groups 1214 may be defined according to any criteria, such as size, shape, or location of the group 1214. In addition, the neighborhoods may be defined according to one or more types of data, such as groups 1214 of failures 1210, global outliers 1212, or hybrid outliers 1212. In the present embodiment, the outlier classification engine 112 identifies neighborhoods comprising a minimum number of test results for adjacent components 106 having failures 1210, global outliers 1212, and hybrid outliers 1212.

Upon identifying the relevant neighborhoods, the outlier classification engine 112 identifies spatially related test results that do not comprise failures 1210, global outliers 1212, and hybrid outliers 1212. For example, test results for components 106 adjacent at least one, two, or three components 106 in the group 1214, or within a selected distance from the group 1214, may be designated for further analysis. The identified components 106 may be designated, for example as "suspect" components 1216 or the like. The identified suspect components 1216 and test results may be further analyzed, designated as outliers, and/or reported.

The supplementary data analysis element may further include a diagnostic system including a pattern recognition system for identifying process characteristics based on patterns recognized in the test data for identifying process characteristics based on patterns recognized in the test data. The pattern recognition system is suitably configured to receive the data from the various sources and identify patterns in the data. The pattern recognition system is also suitably configured to match the identified patterns with known issues associated with such patterns, for example by assigning a likelihood of a particular issue based on the identified pattern. For example, clusters of devices having similar non-passing bin results or outliers located in the same position on different wafers may indicate a particular problem in the manufacturing process. The pattern recognition system identifies and analyzes patterns in the data that may indicate such issues in the manufacturing and/or test process. The pattern recognition system is described is further detail in U.S. Pat. No. 7,395,170 (Publication No. US-2004-0267477-A1), filed Apr. 2, 2004, the disclosure of which is hereby incorporated by reference. In the present embodiment, the pattern recognition system may identify a repetitive pattern of defects or outliers on a wafer or series of wafers, such as due to reticle or stepper related problems. The pattern recognition system may then use the identified pattern to identify potentially defective or outlier devices on the wafer, even though the devices may seem unaffected.

The computer 108 collects data from the test system 100, suitably at run time or in conjunction with an in-line process, and provides an output report to a printer, database, operator interface, or other desired destination. Any form, such as graphical, numerical, textual, printed, or electronic form, may be used to present the output report for use or subsequent analysis. The output element may provide any selected content, including selected output test data from the tester 102 and results of the supplementary data analysis.

In the present embodiment, the output element suitably provides a selection of data from the output test data specified by the operator as well as supplemental data. The computer 108 may also be configured to include information relating to the outliers, or other information generated or identified by the supplementary data analysis element. If so configured, the identifiers, such as x-y coordinates, for each of the outliers are assembled as well. The coordinates for the operator-selected components and the outliers are merged into an output report which in the current embodiment is in the format of the native tester data output format. Merging resulting data into the dynamic datalog facilitates compression of the original data into summary statistics and critical raw data values into a smaller native tester data file, reducing data storage requirements without compromising data integrity for subsequent customer analysis.

The retrieved information is then suitably stored. The report may be prepared in any appropriate format or manner. In the present embodiment, the output report suitably includes the dynamic datalog having a wafer map indicating the selected components on the wafer and their categorization. Further, the output element may superimpose wafer map data corresponding to outliers on the wafer map of the preselected components. Additionally, the output element may include only the outliers from the wafer map or batch as the sampled output. The output report may also include a series of graphical representations of the data to highlight the occurrence of outliers and correlations in the data.

The output report may further include recommendations and supporting data for the recommendations. For example, if two tests appear to generate identical sets of failures and/or outliers, the output report may include a suggestion that the tests are redundant and recommend that one of the tests be omitted from the test program. The recommendation may include a graphical representation of the data showing the identical results of the tests.

The output report may be provided in any suitable manner, for example output to a local workstation, sent to a server, activation of an alarm, or any other appropriate manner (step 712). In one embodiment, the output report may be provided off-line such that the output does not affect the operation of the system or transfer to the main server. In this configuration, the computer 108 copies data files, performs the analysis, and generates results, for example for demonstration or verification purposes.

The particular implementations shown and described are merely illustrative of the invention and its best mode and are not intended to otherwise limit the scope of the present invention in any way. For the sake of brevity, conventional signal processing, data transmission, and other functional aspects of the systems (and components of the individual operating components of the systems) may not be described in detail. Furthermore, the connecting lines shown in the various figures are intended to represent exemplary functional relationships and/or physical couplings between the various elements. Many alternative or additional functional relationships or physical connections may be present in a practical system. The present invention has been described above with reference to a preferred embodiment. Changes and modifications may be made, however, without departing from the scope of the present invention. These and other changes or modifications are intended to be included within the scope of the present invention, as expressed in the following claims.

The invention claimed is:

1. A semiconductor test data analysis system for identifying outliers in semiconductor test data, comprising:
   a memory configured to store the test data; and
   a processor connected to the memory, wherein the processor is configured to:
      retrieve the test data from memory;
      compare the test data to an upper outlier threshold and a lower outlier threshold, wherein the upper outlier threshold and the lower outlier threshold are derived from a median of a frequency distribution of the test data; and
      determine whether the test data include outliers according to the comparison of the test data to the upper outlier threshold and the lower outlier threshold.

2. A semiconductor test data analysis system according to claim 1, wherein:
   the upper outlier threshold is derived from a third quartile mark; and
   the lower outlier threshold is derived from a first quartile mark.

3. A semiconductor test data analysis system according to claim 1, wherein the thresholds are asymmetric relative to the median.

4. A semiconductor test data analysis system according to claim 1, wherein the processor is configured to adjust the thresholds according to a slope of the frequency distribution.

5. A semiconductor test data analysis system according to claim 1, wherein the processor is configured to categorize the outliers according to a magnitude of the outliers.

6. A semiconductor test data analysis system according to claim 1, wherein the processor is configured to assign categories to the outliers according to a range between at least one of the thresholds and an edge of the distribution.

7. A semiconductor test data analysis system according to claim 1, wherein the processor is configured to determine whether the test data include outliers according to a correlation of data corresponding to at least two parameters.

8. A non-transitory computer readable medium containing computer instructions stored therein for causing a computer processor to perform a method of identifying outliers in semiconductor test data, comprising:
   establishing an upper outlier threshold and a lower outlier threshold according to the test data, wherein the upper outlier threshold and the lower outlier threshold are derived from a median of a frequency distribution of the test data;
   comparing the test data to the upper outlier threshold and the lower outlier threshold; and
   identifying outliers in the test data according to the comparison of the test data to the upper outlier threshold and the lower outlier threshold.

9. A non-transitory computer readable medium containing computer instructions stored therein for causing a computer processor to perform a method of identifying outliers according to claim 8, wherein:
   establishing the upper outlier threshold comprises identifying a third quartile mark; and
   establishing the lower outlier threshold comprises identifying a first quartile mark.

10. A non-transitory computer readable medium containing computer instructions stored therein for causing a computer processor to perform a method of identifying outliers according to claim 8, wherein the thresholds are asymmetric relative to the median.

11. A non-transitory computer readable medium containing computer instructions stored therein for causing a computer processor to perform a method of identifying outliers according to claim 8, wherein establishing the upper outlier threshold and the lower outlier threshold includes adjusting the thresholds according to a slope of the frequency distribution.

12. A non-transitory computer readable medium containing computer instructions stored therein for causing a computer processor to perform a method of identifying outliers according to claim 8, further comprising categorizing the outliers according to a magnitude of the outliers.

13. A non-transitory computer readable medium containing computer instructions stored therein for causing a computer processor to perform a method of identifying outliers according to claim 8, further comprising assigning categories to the outliers according to a range between at least one of the thresholds and an edge of the distribution.

14. A non-transitory computer readable medium containing computer instructions stored therein for causing a computer processor to perform a method of identifying outliers according to claim 8, further comprising determining whether the test data include outliers according to a correlation of data corresponding to at least two parameters.

15. A medium storing instructions for causing a computer to execute a process, wherein the process comprises:
   retrieving a set of semiconductor test data from a memory;
   establishing an upper outlier threshold and a lower outlier threshold, wherein the upper outlier threshold and the lower outlier threshold are derived from a median of a frequency distribution of the test data;
   comparing the test data to the upper outlier threshold and the lower outlier threshold; and
   determining whether the test data include outliers according to the comparison of the test data to the upper outlier threshold and the lower outlier threshold.

16. A medium according to claim 15, wherein:
establishing the upper outlier threshold comprises identifying a third quartile mark; and
establishing the upper outlier threshold comprises identifying a first quartile mark.

17. A medium according to claim 15, wherein the thresholds are asymmetric relative to the median.

18. A medium according to claim 15, wherein establishing the upper outlier threshold and the lower outlier threshold includes adjusting the thresholds according to a slope of the frequency distribution.

19. A medium according to claim 15, wherein the process further comprises categorizing the outliers according to a magnitude of the outliers.

20. A medium according to claim 15, wherein the process further comprises assigning categories to the outliers according to a range between at least one of the thresholds and an edge of the distribution.

21. A medium according to claim 15, wherein the process further comprises determining whether the test data include outliers according to a correlation of data corresponding to at least two parameters.

* * * * *